United States Patent
Yokoo

(10) Patent No.: US 11,876,262 B2
(45) Date of Patent: Jan. 16, 2024

(54) FUEL CELL POWER UNBALANCING TO CONTROL DEGRADATION AND IMPROVE PERFORMANCE

(71) Applicant: Toyota Motor Engineering & Manufacturing North America, Inc, Plano, TX (US)

(72) Inventor: Takehito Yokoo, Aliso Viejo, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 272 days.

(21) Appl. No.: 17/193,188

(22) Filed: Mar. 5, 2021

(65) Prior Publication Data

US 2022/0285706 A1    Sep. 8, 2022

(51) Int. Cl.
*H01M 8/04537* (2016.01)
*B60L 58/33* (2019.01)

(52) U.S. Cl.
CPC ......... *H01M 8/04619* (2013.01); *B60L 58/33* (2019.02); *H01M 2250/20* (2013.01)

(58) Field of Classification Search
CPC .......... H01M 8/04619; H01M 2250/20; B60L 58/33
See application file for complete search history.

(56) References Cited

U.S. PATENT DOCUMENTS

| | | | |
|---|---|---|---|
| 8,453,451 B2 | 6/2013 | Chaki et al. | |
| 8,563,188 B2 | 10/2013 | Edlund et al. | |
| 10,483,573 B2 | 11/2019 | Agnew | |
| 2007/0264541 A1 | 11/2007 | Yanase et al. | |
| 2008/0152959 A1 | 6/2008 | Schumer et al. | |
| 2009/0302691 A1 | 12/2009 | Wang et al. | |
| 2013/0059220 A1* | 3/2013 | Kim ................. | H01M 8/04992 429/432 |
| 2014/0017584 A1* | 1/2014 | Schade ............ | H01M 8/04365 429/444 |
| 2015/0236365 A1 | 8/2015 | Liu et al. | |
| 2015/0318565 A1* | 11/2015 | Ryu ..................... | H01M 10/48 429/430 |
| 2016/0258363 A1 | 9/2016 | Tiwari et al. | |

FOREIGN PATENT DOCUMENTS

| | | |
|---|---|---|
| DE | 102018218088 A1 * | 4/2020 |
| JP | 62113362 A | 5/1987 |
| JP | 5168861 A | 3/2008 |
| KR | 102039954 B1 | 11/2019 |
| WO | 2006059776 A2 | 6/2006 |
| WO | 2009069884 A1 | 6/2009 |

OTHER PUBLICATIONS

English machine translation of Lucas (DE 102018218088 A1) (Year: 2020).*
Department of Energy, "Fuel Cells," <energy.gov/eere/fuelcells/fuel-cells>, retrieved Feb. 3, 2021, 5 pages.
International Search Report and Written Opinion for PCT/US2022/018660 dated Jun. 16, 2022, 8 pages.

* cited by examiner

*Primary Examiner* — Sarah A. Slifka
(74) *Attorney, Agent, or Firm* — Jordan IP Law, LLC

(57) ABSTRACT

Methods and systems may provide for technology to detect an unbalanced degradation among a plurality of fuel cells in an automotive system and apply an unbalanced control across the plurality of fuel cells based on the unbalanced degradation. In one example, the unbalanced control balances the degradation among the plurality of fuel cells.

18 Claims, 7 Drawing Sheets

FUEL CELL POWER UNBALANCING TO CONTROL DEGRADATION AND IMPROVE PERFORMANCE

TECHNICAL FIELD

Embodiments generally relate to fuel cells. More particularly, embodiments relate to fuel cell power unbalancing to control degradation and improve performance.

BACKGROUND

Systems that are powered by multiple fuel cells may typically attempt to balance the total output power of the fuel cells equally across the fuel cells (e.g., two fuel cells with each fuel cell delivering 50% of the target output power). Due to manufacturing process variations, however, some fuel cells may degrade more quickly over time than other fuel cells. As a result, the system may encounter performance problems once a subset of the fuel cells degrade to a point where the target output power can no longer be achieved under a balanced control approach.

BRIEF SUMMARY

In one embodiment, an automotive system comprises a plurality of fuel cells and a controller coupled to the plurality of fuel cells, the controller including a stored set of instructions, which when executed by the controller, cause the controller to detect an unbalanced degradation among the plurality of fuel cells and apply an unbalanced control across the plurality of fuel cells based on the unbalanced degradation.

In another embodiment, at least one computer readable storage medium comprises a set of instructions, which when executed by an automotive system, cause the automotive system to detect an unbalanced degradation among a plurality of fuel cells in the automotive system and apply an unbalanced control across the plurality of fuel cells based on the unbalanced degradation.

In yet another embodiment, a method comprises detecting an unbalanced degradation among a plurality of fuel cells in an automotive system and applying an unbalanced control across the plurality of fuel cells based on the unbalanced degradation.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
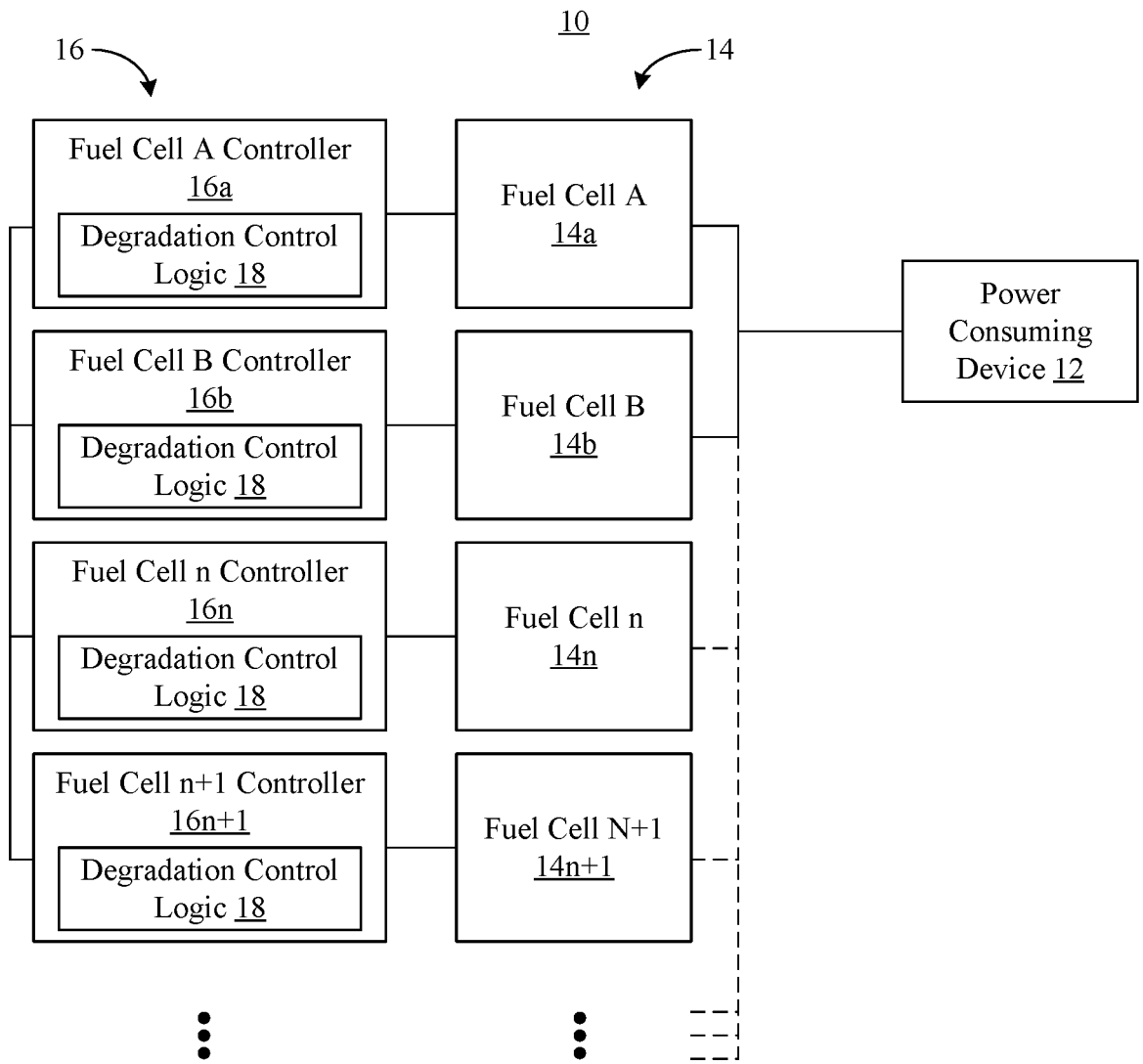
FIG. 1 is a block diagram of an example of a system according to an embodiment.

Turning now to FIG. 1, a system 10 such as, for example, an automotive system (e.g., car, truck, motorcycle, bus, etc.) is shown in which a power consuming device 12 (e.g., vehicle traction motor, driveshaft, etc.) is powered by a plurality of fuel cells 14 (14a-14n+1). In an embodiment, each fuel cell 14 includes two electrodes—a negative electrode (e.g., anode) and a positive electrode (e.g., cathode)—sandwiched around an electrolyte. A fuel, such as hydrogen (e.g., $H_2$), may be injected to the anode and air may be fed to the cathode. If hydrogen is used as the fuel, a catalyst at the anode separates hydrogen molecules into protons and electrons, which take different paths to the cathode. In one example, the electrons pass through an external circuit (e.g., direct current to direct current/DC-DC converter, inverter, etc.) that provides power to the power consuming device 12 (e.g., load). Additionally, the protons may migrate through the electrolyte to the cathode and unite with oxygen and the electrons to produce water and heat.

Due to manufacturing process variations, some of the fuel cells 14 may degrade more quickly over time than other fuel cells 14. For example, a first fuel cell 14a may have a greater degradation rate than a second fuel cell 14b. In the illustrated example, a plurality of controllers 16 (16a-16n+1) include degradation control logic 18 (e.g., logic instructions, configurable logic, fixed-functionality hardware logic) to automatically detect an unbalanced degradation among the plurality of fuel cells 14 and apply an unbalanced control across the plurality of fuel cells 14 based on the unbalanced degradation. As will be discussed in greater detail, the unbalanced control may balance the degradation among the plurality of fuel cells 14. Accordingly, the system 10 may delay and/or avoid performance problems associated with a subset of the fuel cells 14 degrading to a point where the target output power can no longer be achieved under a balanced control approach.

Although the degradation control logic 18 is shown as distributed across the controllers 16, the degradation control logic 18 may alternatively be located in one of the fuel cells 14 (e.g., elected as a supervisory controller) or another component external to the controllers 16.

Figure 2:
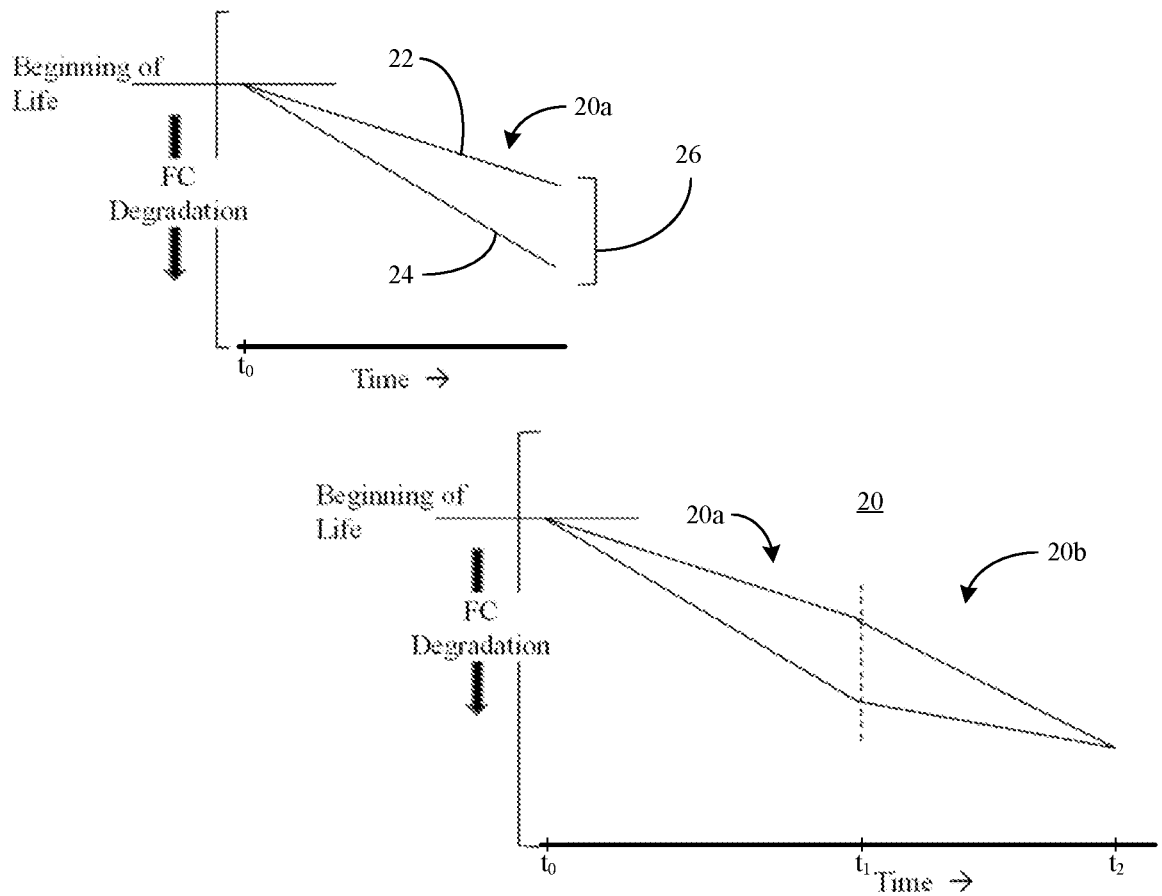
FIG. 2 is a plot of an example of a fuel cell power unbalancing timeline according to an embodiment.

FIG. 2 shows a first portion 20a (e.g., beginning at time t0) of a timeline 20 (20a, 20b) in which a first degradation curve 22 is associated with a first fuel cell (e.g., fuel cell/FC A) and a second degradation curve 24 is associated with a second fuel cell (e.g., FC B). During the first portion 20a of the timeline 20, a balanced control might be applied across the first fuel cell and the second fuel cell so that, for example, the first fuel cell provides approximately 50% of the total power output and the second fuel cell provides approximately 50% of the total power output. In the illustrated example, the second fuel cell has a greater degradation rate than the first fuel cell. As will be discussed in greater detail, the unbalanced degradation may be detected via various operating parameters. If it is detected, for example, that a difference 26 between the first degradation curve 22 and the second degradation curve 24 has exceeded a predetermined threshold, an unbalanced control may be applied across the fuel cells during a second portion 20b (e.g., beginning at time $t_1$) of the timeline 20 based on the unbalanced degradation. In an embodiment, the unbalanced control causes the first fuel cell to degrade more rapidly and the second fuel cell to degrade less rapidly. At time $t_2$, the unbalanced control balances the degradation among the plurality of fuel cells. Correcting the unbalanced degradation as shown may significantly enhance performance and/or durability.

Figure 3A:
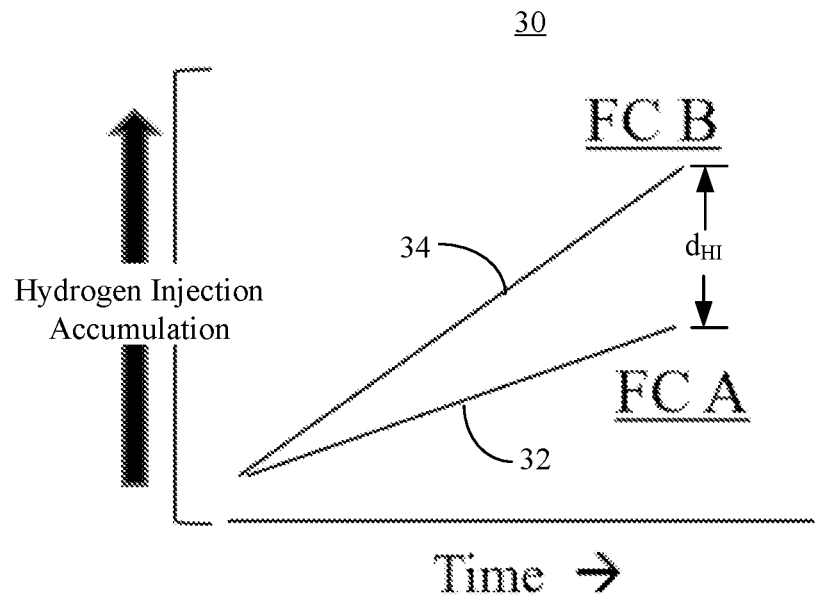
FIG. 3A is a plot of an example of a cumulative hydrogen injection difference according to an embodiment.

Turning now to FIG. 3A, a plot 30 is shown in which a cumulative hydrogen injection difference ($d_{HI}$, e.g., the accumulated/summation hydrogen injector open time) between a first curve 32 (e.g., associated with FC A) and a second curve 34 (e.g., associated with FC B) is monitored as an operating parameter and compared to an appropriate threshold. In an embodiment, an increased cumulative amount of hydrogen injection is indicative of degradation within the fuel cell. Once the cumulative hydrogen injection difference exceeds the threshold, an unbalanced control may be automatically applied across the fuel cells to balance out the degradation.

Figure 3B:
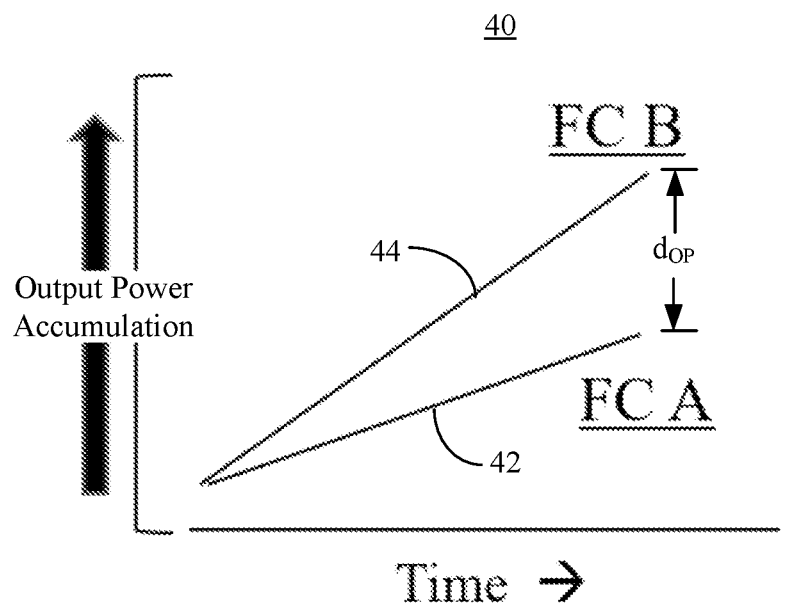
FIG. 3B is a plot of an example of a cumulative output power difference according to an embodiment.

Turning now to FIG. 3B, a plot 40 is shown in which a cumulative output power difference ($d_{OP}$, e.g., the accumulated/summation amount of output power generated by the fuel cell stack) between a first curve 42 (e.g., associated with FC A) and a second curve 44 (e.g., associated with FC B) is monitored as an operating parameter and compared to an appropriate threshold. In an embodiment, an increased cumulative amount of output power is indicative of degradation within the fuel cell. Once the cumulative output power difference exceeds the threshold, an unbalanced control may be automatically applied across the fuel cells to balance out the degradation.

Figure 3C:
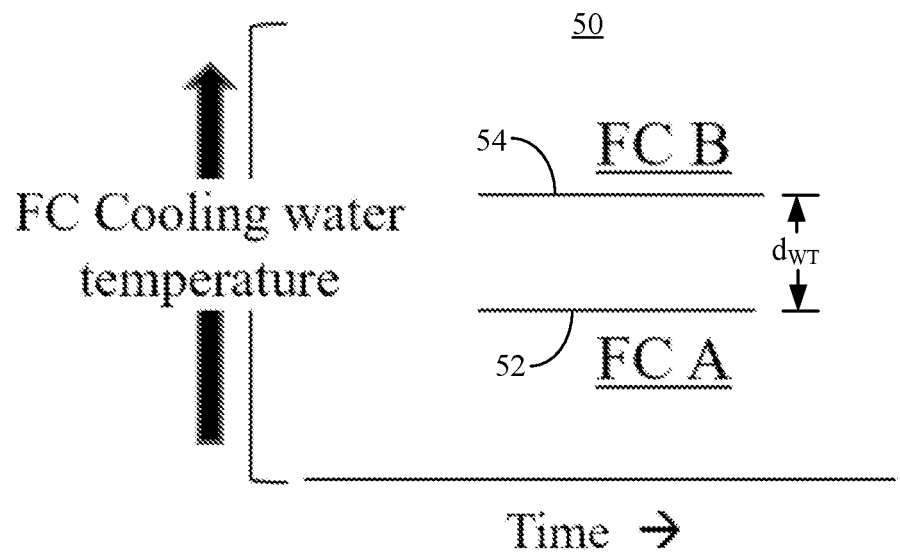
FIG. 3C is a plot of an example of a cooling water temperature difference according to an embodiment.

Turning now to FIG. 3C, a plot 50 is shown in which a cooling water temperature difference ($d_{WT}$, e.g., the temperature of water used to cool the fuel cell stack) between a first curve 52 (e.g., associated with FC A) and a second curve 54 (e.g., associated with FC B) is monitored as an operating parameter and compared to an appropriate threshold. In an embodiment, a relatively high temperature of cooling water (e.g., compared to one or more other fuel cells) is indicative of degradation within a fuel cell if the fuel cell is producing the same amount of power as the other fuel cell(s) (e.g., balanced output power). If the cooling water temperature difference is above the threshold, an unbalanced control may be automatically applied across the fuel cells to balance out the degradation.

Figure 3D:
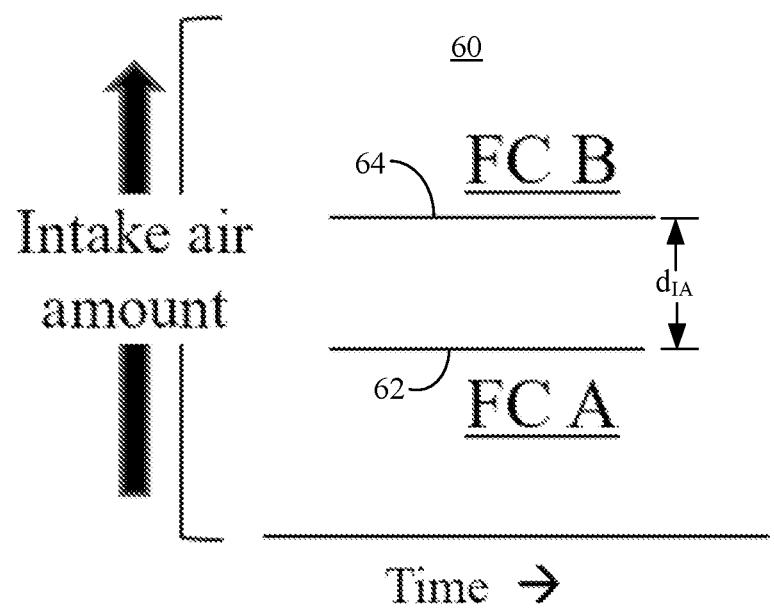
FIG. 3D is a plot of an example of an intake air amount difference according to an embodiment.

Turning now to FIG. 3D, a plot 60 is shown in which an intake air amount difference ($d_{IA}$, e.g., the amount of air allowed into the fuel cell stack) between a first curve 62 (e.g., associated with FC A) and a second curve 64 (e.g., associated with FC B) is monitored as an operating parameter and compared to an appropriate threshold. In an embodiment, a relatively high amount of intake air (e.g., compared to one or more other fuel cells) is indicative of degradation within a fuel cell if the fuel cell is producing the same amount of power as the other fuel cell(s) (e.g., balanced output power). If the cumulative intake air amount difference is above the threshold, an unbalanced control may be automatically applied across the fuel cells to balance out the degradation.

Figure 3E:
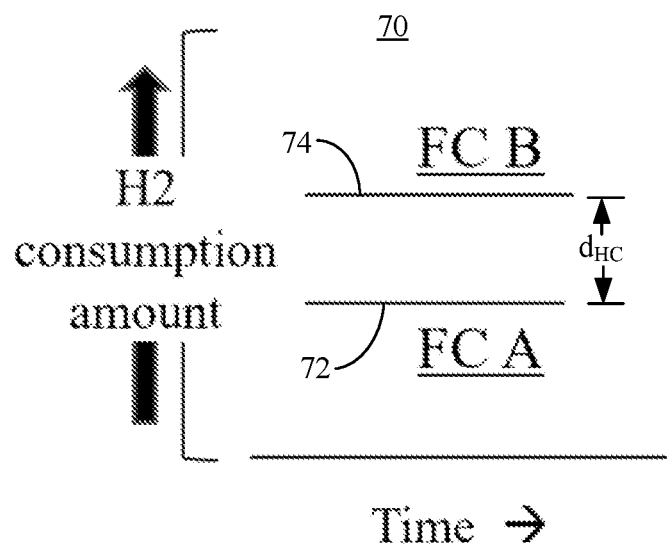
FIG. 3E is a plot of an example of a hydrogen consumption amount difference according to an embodiment.

Turning now to FIG. 3E, a plot 70 is shown in which a hydrogen consumption amount difference ($d_{HC}$, e.g., the amount of hydrogen consumed by the fuel cell stack) between a first curve 72 (e.g., associated with FC A) and a second curve 74 (e.g., associated with FC B) is monitored as an operating parameter and compared to an appropriate threshold. In an embodiment, a relatively high amount of hydrogen consumption (e.g., compared to one or more other fuel cells) is indicative of degradation within a fuel cell if the fuel cell is producing the same amount of power as the other fuel cell(s) (e.g., balanced output power). If the hydrogen consumption amount difference is above the threshold, an unbalanced control may be automatically applied across the fuel cells to balance out the degradation. Other operating parameters may also be used to detect the unbalanced degradation.

Figure 4A:
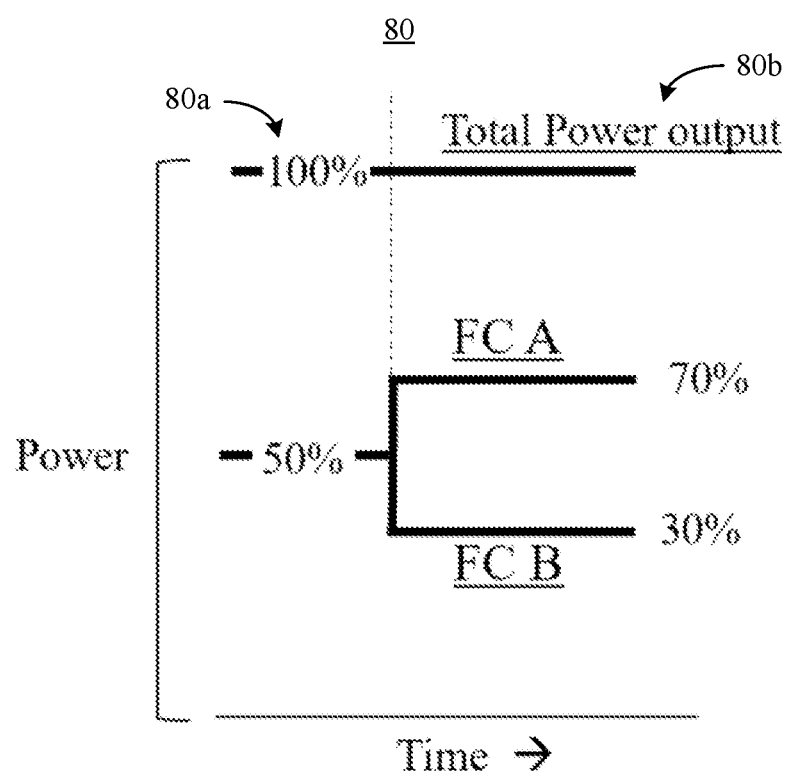
FIG. 4A is a plot of an example of an unbalanced control across a plurality of fuel cells according to an embodiment.

FIG. 4A shows a timeline 80 (80a, 80b) in which balanced output power is produced by a plurality of fuel cells during a first portion 80a of the timeline 80. In the illustrated example, a first fuel cell (e.g., FC A) and a second fuel cell (e.g., FC B) both produce 50% of the total power output during the first portion 80a. By contrast, during a second portion 80b of the timeline 80, the first fuel cell produces 70% of the total power output and the second fuel cell produces 30% of the total power output. Thus, the illustrated unbalanced control might be used if it is determined that the second fuel cell is deteriorating more rapidly than the first fuel cell.

Figure 4B:
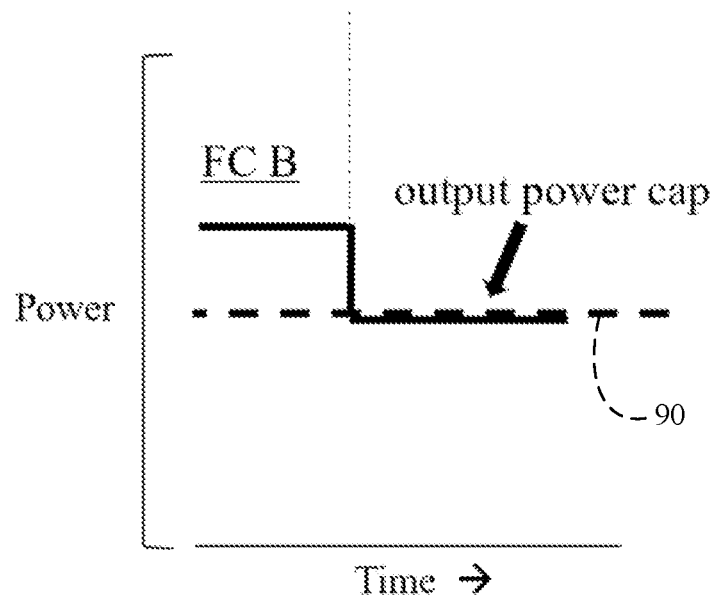
FIG. 4B is a plot of an example of an output power cap according to an embodiment.

FIG. 4B demonstrates that one approach to decreasing the output power of the fuel cell is to apply an output power cap 90 to the fuel cell. In the illustrated example, the output power of FC B is limited to the level of the cap 90.

Figure 4C:
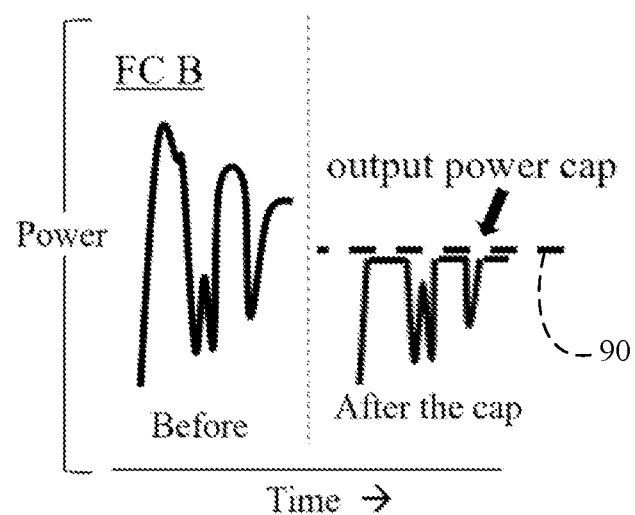
FIG. 4C is a plot of an example of a result of the output power cap of FIG. 4B according to an embodiment.

FIG. 4C demonstrates that before the output power cap 90 is applied, the fuel cell power has a relatively high dynamic range and is permitted to peak at levels above the cap 90. After the cap 90 is applied, however, the fuel cell power has a lower dynamic range and is not permitted to exceed the level of the cap 90. Other approaches to decreasing the output power of a fuel cell include, for example, limiting the number of hydrogen injector pulsations, reducing the total hours of operation, and so forth.

Figure 5:
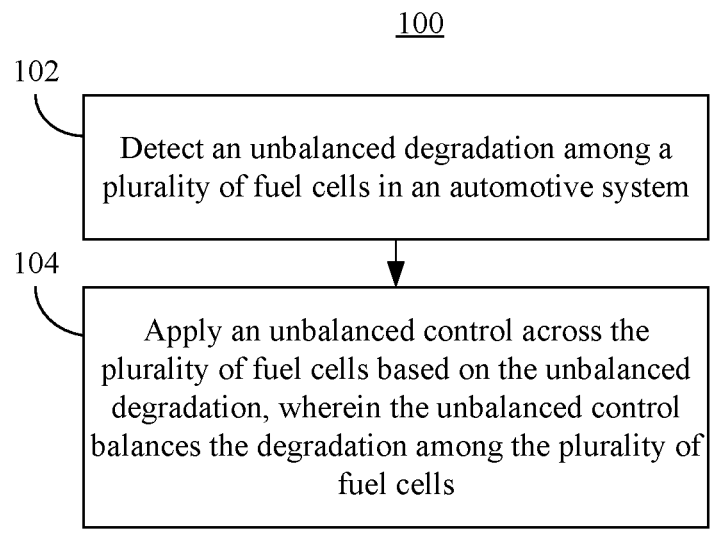
FIG. 5 is a flowchart of an example of a method of operating a controller according to an embodiment.

FIG. 5 shows a method 100 of operating a system such as, for example, the system 10 (FIG. 1) and/or a controller such as, for example, one or more of the controllers 16 (FIG. 1), already discussed. The method 100 may be implemented in logic instructions (e.g., software), configurable logic, fixed-functionality hardware logic, etc., or any combination thereof. Illustrated processing block 102 provides for detecting an unbalanced degradation among a plurality of fuel cells in an automotive system. In an embodiment, block 102 involves detecting an operating parameter difference between a first fuel cell in the plurality of fuel cells and a second fuel cell in the plurality of fuel cells. In one example, the operating parameter difference is a cumulative hydrogen injection difference, a cumulative output power difference, a cooling water temperature difference, an air intake amount difference, a hydrogen consumption amount difference, etc., or any combination thereof. Additionally, the cooling water temperature difference, the intake air amount difference and/or the hydrogen consumption amount difference may be determined while the first fuel cell and the second fuel cell produce balanced output power.

Block 104 applies an unbalanced control across the plurality of fuel cells based on the unbalanced degradation. In the illustrated example, the unbalanced control balances the degradation among the plurality of fuel cells. The illustrated method 100 therefore enhances performance and/or durability at least to the extent that the intentionally unbalanced control extends the amount of time during which the plurality of fuel cells are able to collectively provide a targeted total amount of output power.

Figure 6:
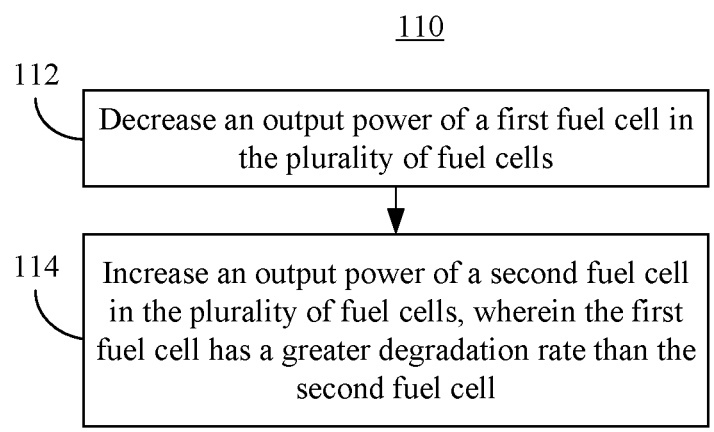
FIG. 6 is a flowchart of an example of a method of applying an unbalanced control across a plurality of fuel cells according to an embodiment.

FIG. 6 shows a method 110 of applying an unbalanced control across a plurality of fuel cells. The method 110 may generally be incorporated into block 104 (FIG. 5), already discussed. In an embodiment, the method 110 is implemented in logic instructions (e.g., software), configurable logic, fixed-functionality hardware logic, etc., or any combination thereof. Illustrated processing block 112 decreases an output power of a first fuel cell in the plurality of fuel cells. In one example, block 112 involves applying an output power cap to the first fuel cell. Block 114 may increase an output power of a second fuel cell in the plurality of fuel cells, wherein the first fuel cell has a greater degradation rate than the second fuel cell. The illustrated method 110 further enhances performance and/or durability at least to the extent that intentionally decreasing the output power of the first fuel cell slows the degradation rate of the first fuel cell and extends the life of the system.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. An automotive system comprising:
   a plurality of fuel cells; and
   a controller coupled to the plurality of fuel cells, the controller including a stored set of instructions, which when executed by the controller, cause the controller to:
   predict an unbalanced degradation in a first fuel cell as compared to one or more other fuel cells among the plurality of fuel cells, wherein the prediction occurs before the plurality of fuel cells produce unbalanced output power, and
   apply an unbalanced control across the plurality of fuel cells based on the unbalanced degradation, wherein the unbalanced degradation indicates that the first fuel cell will degrade more quickly over time as compared to the one or more other fuel cells, and wherein the unbalanced control is to balance the degradation among the plurality of fuel cells so that a first degradation curve of the first fuel cell is adjusted over time to converge with a second degradation curve of the one or more other fuel cells.

2. The automotive system of claim 1, wherein to apply the unbalanced control, the instructions, when executed, cause the controller to:
   decrease an output power of the first fuel cell in the plurality of fuel cells, and
   increase an output power of a second fuel cell in the plurality of fuel cells, wherein the first fuel cell is to have a greater degradation rate than the second fuel cell.

3. The automotive system of claim 2, wherein to decrease the power output of the first fuel cell, the instructions, when executed, cause the controller to apply an output power cap to the first fuel cell.

4. The automotive system of claim 1, wherein to predict the unbalanced degradation, the instructions, when executed, cause the controller to detect an operating parameter difference between the first fuel cell in the plurality of fuel cells and a second fuel cell in the plurality of fuel cells.

5. The automotive system of claim 4, wherein the operating parameter difference is one or more of a cumulative hydrogen injection difference, a cumulative output power difference, a cooling water temperature difference, an intake air amount difference or a hydrogen consumption amount difference.

6. The automotive system of claim 5, wherein one or more of the cooling water temperature difference, the intake air amount difference or the hydrogen consumption amount difference are to be determined while the first fuel cell and the second fuel cell produce balanced output power.

7. At least one computer readable storage medium comprising a set of instructions, which when executed by an automotive system, cause the automotive system to:
   predict an unbalanced degradation in a first fuel cell as compared to one or more other fuel cells among a plurality of fuel cells in the automotive system, wherein the prediction occurs before the plurality of fuel cells produce unbalanced output power; and
   apply an unbalanced control across the plurality of fuel cells based on the unbalanced degradation, wherein the unbalanced degradation indicates that the first fuel cell will degrade more quickly over time as compared to the one or more other fuel cells, and wherein the unbalanced control is to balance the degradation among the plurality of fuel cells so that a first degradation curve of the first fuel cell is adjusted over time to converge with a second degradation curve of the one or more other fuel cells.

8. The at least one computer readable storage medium of claim 7, wherein the unbalanced control is to balance the degradation among the plurality of fuel cells.

9. The at least one computer readable storage medium of claim 7, wherein to apply the unbalanced control, the instructions, when executed, cause the automotive system to:
   decrease an output power of the first fuel cell in the plurality of fuel cells; and
   increase an output power of a second fuel cell in the plurality of fuel cells, wherein the first fuel cell is to have a greater degradation rate than the second fuel cell.

10. The at least one computer readable storage medium of claim 9, wherein to decrease the power output of the first fuel cell, the instructions, when executed, cause the automotive system to apply an output power cap to the first fuel cell.

11. The at least one computer readable storage medium of claim 7, wherein to predict the unbalanced degradation, the instructions, when executed, cause the automotive system to detect an operating parameter difference between the first fuel cell in the plurality of fuel cells and a second fuel cell in the plurality of fuel cells.

12. The at least one computer readable storage medium of claim 11, wherein the operating parameter difference is one or more of a cumulative hydrogen injection difference, a cumulative output power difference, a cooling water temperature difference, an intake air amount difference or a hydrogen consumption amount difference.

13. The at least one computer readable storage medium of claim 12, wherein one or more of the cooling water temperature difference, the intake air amount difference or the hydrogen consumption amount difference are to be determined while the first fuel cell and the second fuel cell produce balanced output power.

14. A method comprising:
predicting an unbalanced degradation in a first fuel cell as compared to one or more other fuel cells among a plurality of fuel cells in an automotive system, wherein the prediction occurs before the plurality of fuel cells produce unbalanced output power; and
applying an unbalanced control across the plurality of fuel cells based on the unbalanced degradation, wherein the unbalanced degradation indicates that the first fuel cell will degrade more quickly over time as compared to the one or more other fuel cells, and wherein the unbalanced control is to balance the degradation among the plurality of fuel cells so that a first degradation curve of the first fuel cell is adjusted over time to converge with a second degradation curve of the one or more other fuel cells.

15. The method of claim 14, wherein applying the unbalanced control includes:
decreasing an output power of the first fuel cell in the plurality of fuel cells; and
increasing an output power of a second fuel cell in the plurality of fuel cells, wherein the first fuel cell has a greater degradation rate than the second fuel cell.

16. The method of claim 15, wherein decreasing the output power of the first fuel cell includes applying an output power cap to the first fuel cell.

17. The method of claim 14, wherein predicting the unbalanced degradation includes detecting an operating parameter difference between the first fuel cell in the plurality of fuel cells and a second fuel cell in the plurality of fuel cells.

18. The method of claim 17, wherein the operating parameter difference is one or more of a cumulative hydrogen injection difference, a cumulative output power difference, a cooling water temperature difference, an intake air amount difference or a hydrogen consumption amount difference.

* * * * *